(12) United States Patent
Lee

(10) Patent No.: US 7,978,315 B2
(45) Date of Patent: Jul. 12, 2011

(54) RANGE FINDER

(75) Inventor: Jin Ho Lee, Dobong-gu (KR)

(73) Assignee: LG Innotek Co., Ltd., Seoul (KR)

( * ) Notice: Subject to any disclaimer, the term of this patent is extended or adjusted under 35 U.S.C. 154(b) by 241 days.

(21) Appl. No.: 12/189,326

(22) Filed: Aug. 11, 2008

(65) Prior Publication Data

US 2009/0073416 A1 Mar. 19, 2009

(30) Foreign Application Priority Data

Aug. 9, 2007 (KR) .................. 10-2007-0079942
Sep. 19, 2007 (KR) .................. 10-2007-0095113
Sep. 19, 2007 (KR) .................. 10-2007-0095115

(51) Int. Cl.
*G01C 3/08* (2006.01)
(52) U.S. Cl. ....... 356/5.01; 356/4.01; 356/5.1; 356/5.15
(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS 4,413,906 A * 11/1983 Feldman et al. ......... 356/139.01
5,805,275 A * 9/1998 Taylor ..................... 356/3.16

FOREIGN PATENT DOCUMENTS

| JP | 7325154 | | 12/1995 |
| JP | 2007-244153 | A | 9/2007 |
| KR | 10-2003-0087019 | A | 11/2003 |
| KR | 1020050046967 | A | 5/2005 |

* cited by examiner

*Primary Examiner* — Thomas H Tarcza
*Assistant Examiner* — Luke D Ratcliffe
(74) *Attorney, Agent, or Firm* — Saliwanchik, Lloyd & Eisenschenk

(57) ABSTRACT

A range finder is provided. A light emitting unit emits a light pulse. A light receiving unit senses an incident light pulse. A reflective mirror reflects the light pulse emitted from the light emitting unit to an outside space and reflects the light pulse incident from the outside space to the light receiving unit. An actuator is configured to move the reflective mirror in a first direction rotating about a vertical axis and a second direction rotating about a horizontal axis. A controller controls the light emitting unit and the light receiving unit and driving the actuator. The actuator includes: a rotation motor unit supporting the reflective mirror to be rotated in the second direction and rotating the reflective mirror in the first direction; a bushing hinge-coupled with the reflective mirror to rotate in the first direction together with the reflective mirror and installed movably in a vertical direction; and a vertical driving unit moving the bushing in the vertical direction.

18 Claims, 18 Drawing Sheets

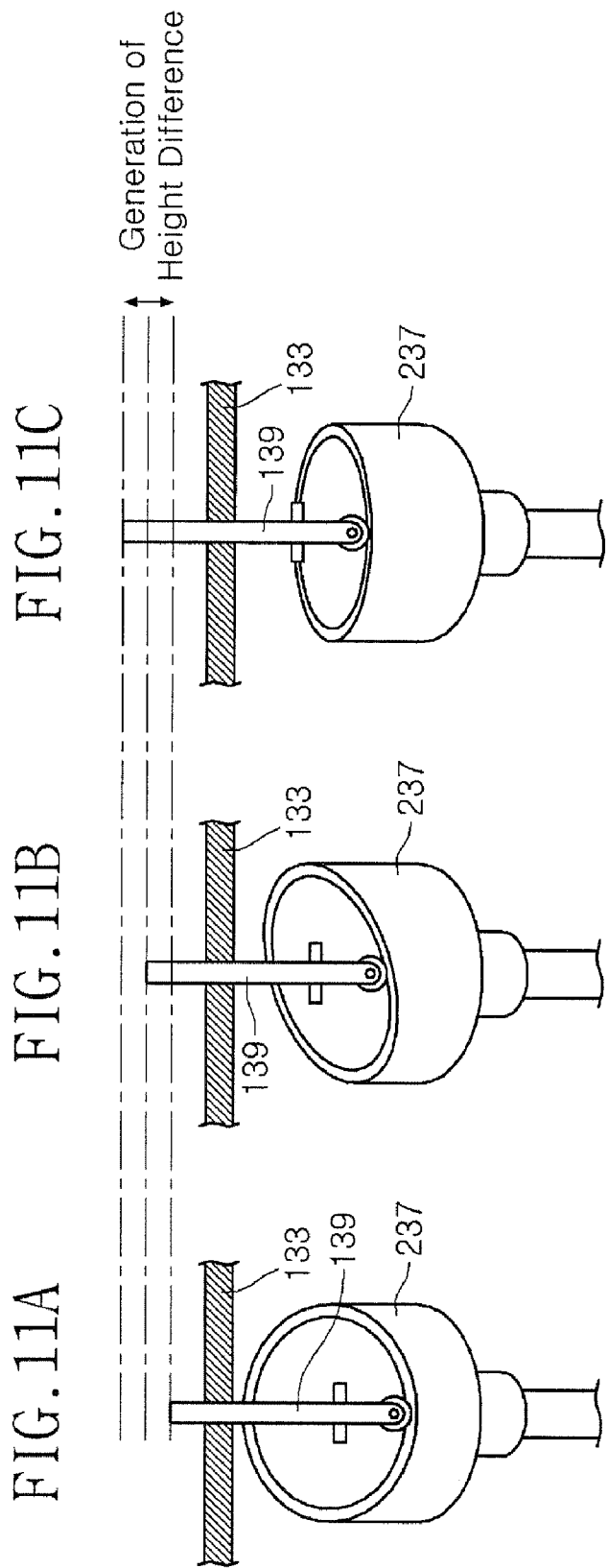

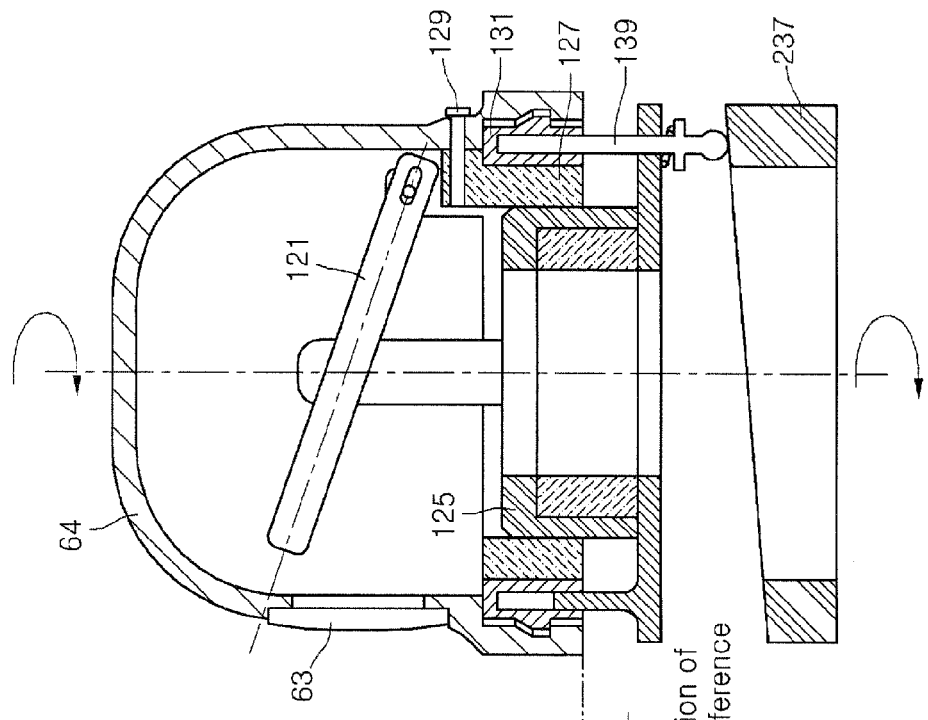
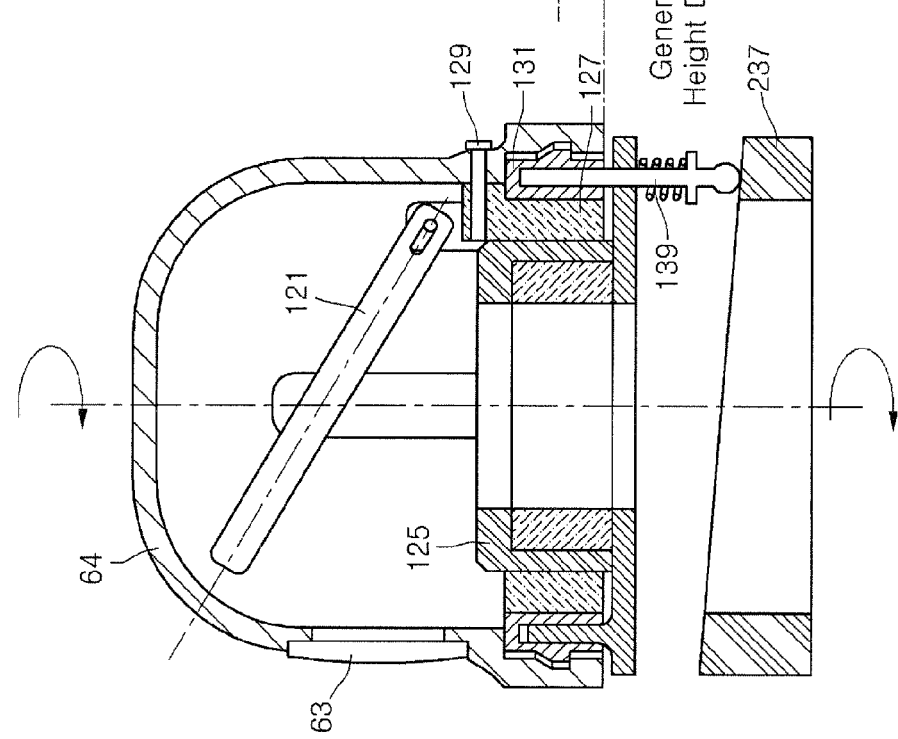

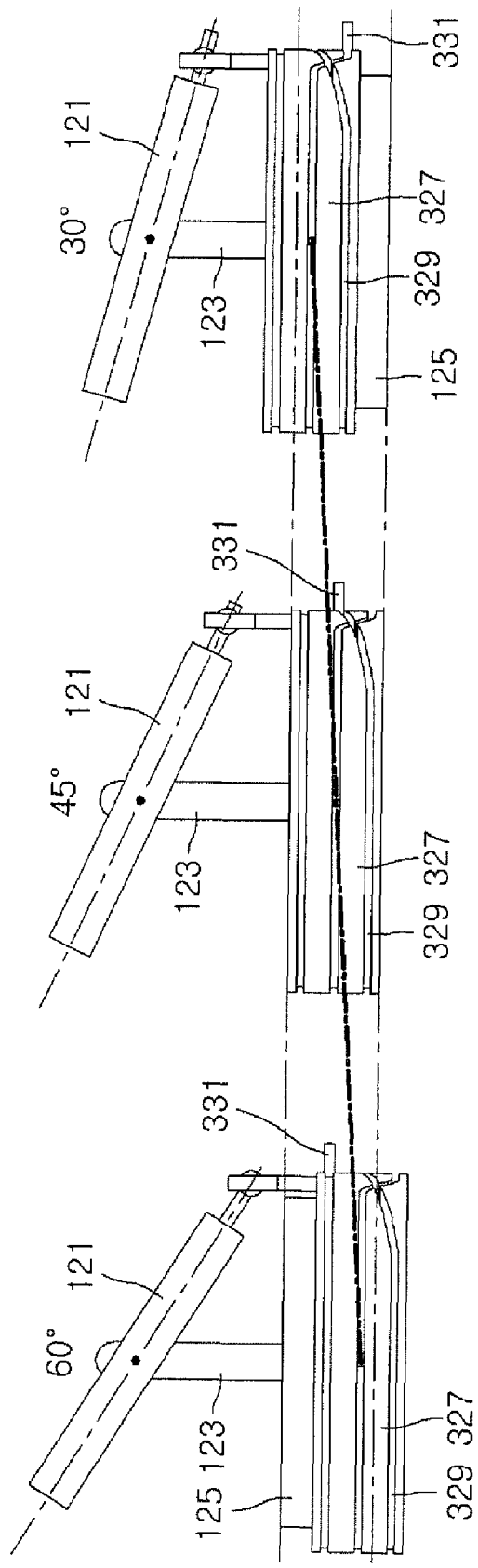

Rotational Lane of Reflective
Mirror in First Direction

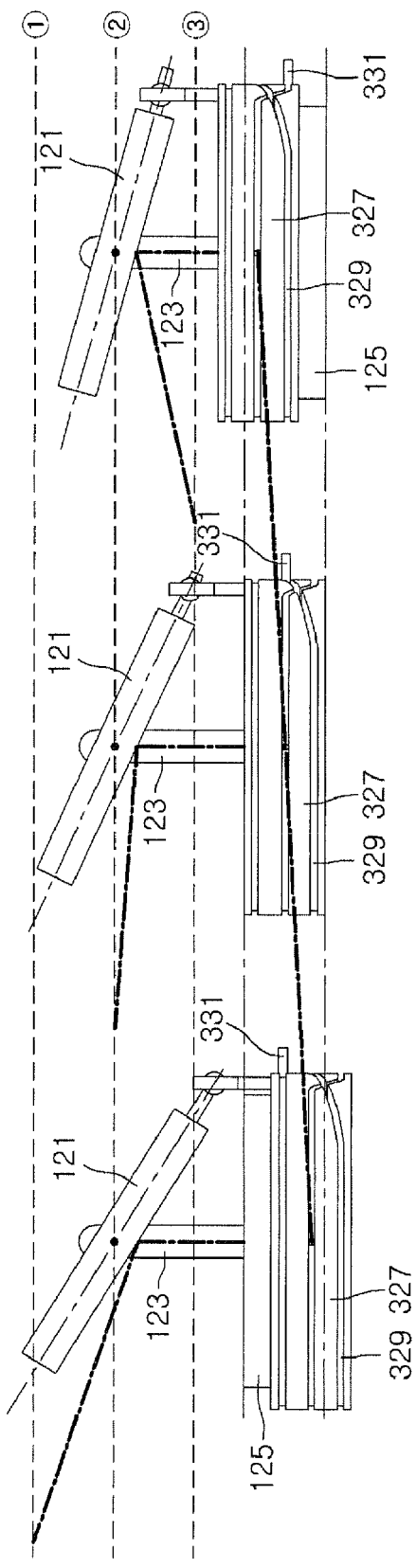

RANGE FINDER

CROSS-REFERENCE TO RELATED APPLICATIONS

The present application claims the benefit under 35 U.S.C. §119 of Korean Patent Applications No. 10-2007-0079942, filed Aug. 9, 2007, 10-2007-0095113, filed Sep. 19, 2007, 10-2007-0095115, filed Sep. 19, 2007, which are hereby incorporated by reference in their entirety.

BACKGROUND

The present disclosure relates to a range finder.

A range finder may be applied to various industrial fields.

For example, for a robot to effectively perform a given job, a high performance three-dimensional space recognition technology is required, and it can be achieved by a range finding using a laser beam pulse.

Also, a range finder may be applied to home service robots represented by cleaning robots, and the home service robots can realize high performance autonomous mobile through a space recognition technology.

Furthermore, as applied to vehicles, the range finder can be applied to vehicles to perform lane recognition and an abrupt stopping due to the sudden appearance of a vehicle or pedestrian, and also makes it possible to perform an autonomous mobile of a vehicle.

Moreover, the range finder may be applied to security units to sense a motion of an object according to a variation in measured distance and determine whether or not there is an intruder.

The range finder can emit a light pulse to an outside space and detect a light pulse reflected by an object positioned in the outside space to compute a distance from the range finder to the object of the outside space and perform a range finding, space recognition, motion sensing of an object, etc.

BRIEF SUMMARY

Embodiments provide a range finder having a new structure.

Embodiments also provide a range finder including an actuator, which allows a light emitted from a light emitting unit to be emitted to an outside space and a light incoming from the outside space to be inputted into a light receiving unit.

Embodiments also provide a miniaturized range finder.

In one embodiment, a range finder includes: a light emitting unit emitting a light pulse; a light receiving unit sensing an incident light pulse; a reflective mirror reflecting the light pulse emitted from the light emitting unit to an outside space and reflecting the light pulse incident from the outside space to the light receiving unit; an actuator configured to move the reflective mirror in a first direction rotating about a vertical axis and a second direction rotating about a horizontal axis; and a controller controlling the light emitting unit and the light receiving unit and driving the actuator, wherein the actuator include: a rotation motor unit supporting the reflective mirror to rotate in the second direction and rotating the reflective mirror in the first direction; a bushing hinge-coupled with the reflective mirror to rotate in the first direction together with the reflective mirror and installed movably in a vertical direction; and a vertical driving unit moving the bushing in the vertical direction.

In another embodiment, a range finder includes: a light emitting unit emitting a light pulse; a light receiving unit sensing an incident light pulse; a reflective mirror reflecting the light pulse emitted from the light emitting unit to an outside space and reflecting the light pulse incident from the outside space to the light receiving unit; an actuator configured to move the reflective mirror in a first direction rotating about a vertical axis and a second direction rotating about a horizontal axis; and a controller controlling the light emitting unit and the light receiving unit and driving the actuator, wherein the actuator includes: a rotation motor unit supporting the reflective mirror to rotate in the second direction and rotating the reflective mirror in the first direction; a solid cam coupled with the reflective mirror to rotate in the first direction together with the reflective mirror and installed movably in a vertical direction; and a bushing guiding the solid cam in the vertical direction.

The details of one or more embodiments are set forth in the accompanying drawings and the description below. Other features will be apparent from the description and drawings, and from the claims.

BRIEF DESCRIPTION OF THE DRAWINGS

FIGS. 9 to 12 are schematic views illustrating a range finder according to a second embodiment.

FIGS. 13 to 16 are schematic views illustrating a range finder according to a third embodiment.

DETAILED DESCRIPTION

Reference will now be made in detail to the embodiments of the present disclosure, examples of which are illustrated in the accompanying drawings.

Figure 1:
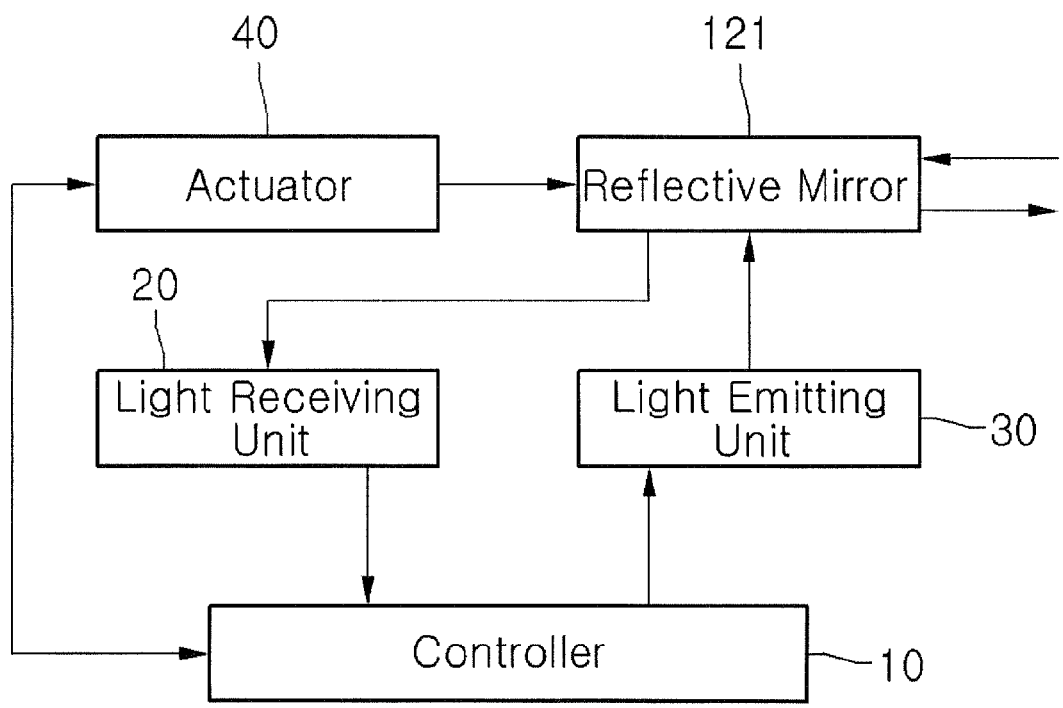
FIG. 1 is a block diagram of a range finder according to an embodiment.

FIG. 1 is a block diagram of a range finder according to an embodiment.

Referring to FIG. 1, the range finder includes a controller 10, a light receiving unit 20, a light emitting unit 30, an actuator 40 and a reflective mirror 121.

The controller 10 drives the actuator 40 and controls the light receiving unit 20 and the light emitting unit 30.

The controller 10 performs a range finding, space recognition, motion sensing of an object, etc. according to a direction in which a light pulse is emitted, i.e., position information of the light pulse, and a distance over which the light pulse progresses to an object in an outside space, i.e., distance information.

For example, the controller 10 may obtain the position information from a direction in which the reflective mirror 121 is moved by an operation of the actuator 40. The controller 10 may drive the actuator 40 to move the reflective mirror 121 according to preset position information.

For example, the controller 10 may obtain the distance information from the velocity of the light pulse and a difference between a time when the light pulse is emitted from the light emitting unit 30 and a time when the light pulse is inputted into the light receiving unit 20.

The controller 10 may transmit the distance information and the position information directly to an external device or process and transmit the distance information and the position information to the external device.

The light emitting unit 30 may include a light emitting element, such as a pulse laser diode. The light receiving unit 20 may include a light receiving element for detecting light, such as a photodiode, or an avalanche photodiode provided therein with an amplifying circuit to detect a fine light source.

The reflective mirror 121 reflects a light pulse emitted from the light emitting unit 30 to a measurement space and allows the returning light pulse reflected by an object of the measurement space to be incident into the light receiving unit 20.

The actuator 40 allows the reflective mirror 121 to rotate in a first direction about a first axis or in a second direction about a second axis perpendicular to the first axis according to the control of the controller 10.

For example, the actuator 40 may drive the reflective mirror 121 to be rotated by 360° in the first direction about the first axis or in the range of ±15° in the second direction about the second axis. Also, the actuator 40 may drive the reflective mirror 121 to be rotated by 180° about the first axis or in the range of ±45° about the second axis.

Since the range finder according to the embodiment performs the range finding while the reflective mirror 121 is rotated about the first axis and the second axis by the actuator 40, it is possible to perform the range finding for a three-dimensional object. That is, the range finder according to the embodiment can realize the three-dimensional space recognition technology.

Figure 2:
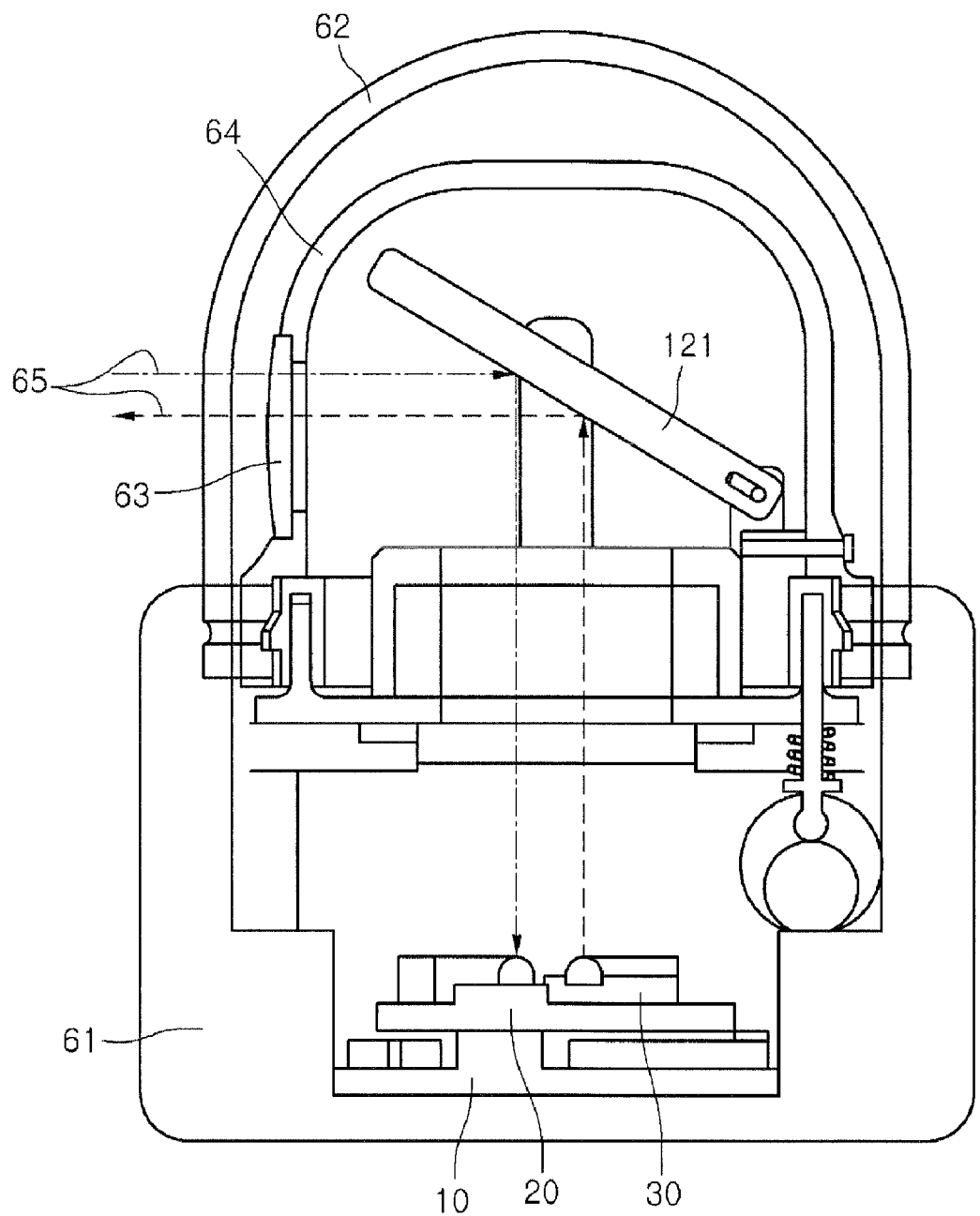
FIG. 2 is a schematic view illustrating a structure of a range finder according to a first embodiment.

FIG. 2 is a schematic view illustrating a structure of a range finder according to a first embodiment of the present invention.

Referring to FIG. 2, the range finder according to the first embodiment includes a lower case 61 and an upper case 62 coupled to each other. In an inner space defined by the lower case 61 and the upper case 62, the reflective mirror 121, the actuator, the light emitting unit 30, the light receiving unit 20, and the controller 10 are disposed.

Also, a lens 63 is disposed inside the upper case 62, and a lens supporter 64 supporting the lens 63 is disposed.

In the range finder having the above constitution, a light pulse 65 generated in the light emitting unit 30 is reflected by the reflective mirror 121 and emitted to an outside space through the lens 63, and the light pulse 65 reflected by an object of the outside space is incident into the light receiving unit 20 through the lens 63 and the reflective mirror 121.

The controller 10 may include a printed circuit board and a driver chip. As shown in the drawing, the controller 10 is disposed inside the space defined by the lower case 61 and the upper case 62 or may be disposed outside the space defined by the lower case 61 and the upper case 62 according to its designs.

Meanwhile, the actuator will be described in more detail below.

FIGS. 3 to 7 and FIGS. 8A and 8B are schematic views illustrating a range finder according to the first embodiment, and the structure and operations of the actuator will now be described with reference to FIGS. 3 to 7 and FIGS. 8A and 8B.

Figure 3:
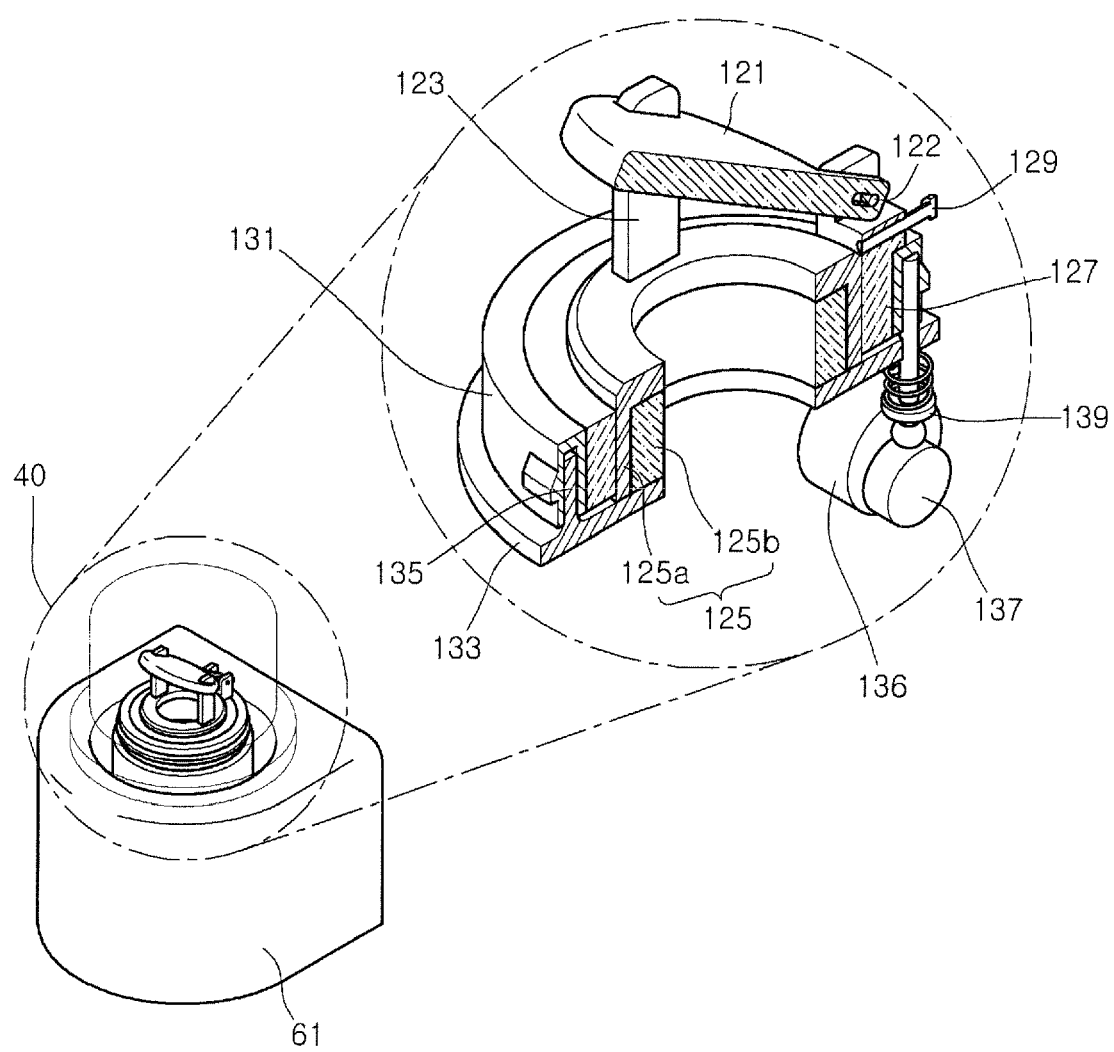
FIGS. 3 to 8 are schematic views illustrating a range finder according to the first embodiment.

Referring to FIG. 3, the actuator 40 moves the reflective mirror 121 in a first direction, for example, a direction rotating about a vertical axis, and in a second direction, for example, a direction rotating about a horizontal direction.

A three-dimensional space recognition is performed through a range finding by the actuator 40 moving the reflective mirror 121 in the first direction and in the second direction.

The actuator 40 includes a supporting plate 133 having a circular opening formed at a center thereof, a rotation motor disposed on the supporting plate 133 and including a rotor 125a and a stator 125b, a reflective mirror supporting bar 123 installed on the rotor 125a of the rotation motor 125 to support the reflective mirror 121 at two portions on a horizontal axis passing through a center of the reflective mirror 121 such that the reflective mirror 121 is rotatable about the horizontal axis, a ring-shaped bushing 127 disposed outside the rotation motor 125 and hinge-coupled with the reflective mirror 121, the ring-shaped bushing 127 rotating together with the reflective mirror 121 while the reflective mirror 121 rotates in the first direction about the vertical axis, and being installed movably in the vertical direction, a bearing 131 disposed outside the bushing 127 to allow the bushing 127 to be moved in the vertical direction, and a circular plate cam 137 and a cam driven shaft 139 allowing the bearing 131 to be moved in the vertical direction.

The reflective mirror 121 rotates in the first direction about the vertical axis and in the second direction about the horizontal direction such that a light emitted from the light emitting unit 30 is emitted to a three-dimensional space.

First, an operation that the reflective mirror 121 rotates in the first direction will be described. When the rotation motor 125 operates, the rotor 125a of the rotation motor 125 rotates in the first direction about the vertical axis. Accordingly, the reflective mirror supporting bar 123 coupled to the rotor 125a rotates together with the rotor 125a and the reflective mirror 121 coupled to the reflective mirror supporting bar 123 rotates in the first direction.

At this time, one end of the reflective mirror 121 is hinge-coupled to the bushing 127, and the bushing 127 rotates together with the rotor 125a outside the rotation motor 125.

Since the bushing 127 is supported by the bearing 131, the bushing 127 can rotate freely together with the reflective mirror 121.

Next, an operation that the reflective mirror 121 rotates in the second direction will be described. When the circular plate cam motor 136 operates, the circular plate cam 137 installed in the circular cam motor 136 rotates. As the circular plate cam 137 rotates, the cam driven shaft 139 moves in the vertical direction. Accordingly, the bearing 131 coupled with the cam driven shaft 139 moves in the vertical direction and the bushing 127 coupled with the bearing 131 moves in the vertical direction.

Accordingly, the reflective mirror 121 hinge-coupled with the bushing 127 rotates in the second direction.

At this time, since the reflective mirror 121 is coupled to the reflective mirror supporting bar 123 rotatably about the horizontal axis, the reflective mirror 121 can freely rotate in the second direction.

In more detail, the circular plate cam 137 rotates about a point offset from a center of the circular plate, and the cam driven shaft 139 is positioned on the circumference of the circular plate cam 137. As the circular plate cam 137 rotates, a distance between the circumference of the circular plate cam 137 and the central axis is changed, so that a position of the cam driven shaft 139 supported on the circumference of the circular plate cam 137 in the vertical direction is changed.

The bearing 131 has a coupling groove opened in a downward direction, and the cam driven shaft 139 penetrating the supporting plate 133 is inserted into the coupling groove of the bearing 131. Accordingly, as the cam driven shaft 139 moves in the vertical direction, the bearing 131 also moves in the vertical direction.

The bearing 131 has another coupling groove opened in the downward direction, and a protruding portion 135 formed on the supporting plate 133 is inserted into the coupling groove of the bearing. Accordingly, the bearing 131 can move only in the vertical direction without a position movement in the horizontal direction.

Also, the bushing 127 has an upper portion protruding to a top surface of the bearing 131. That is, the bushing 127 overlaps the bearing 131 at least partially in the vertical direction. Accordingly, when the bearing 131 moves in the vertical direction, the bushing 127 can also move in the vertical direction.

Figure 4A:
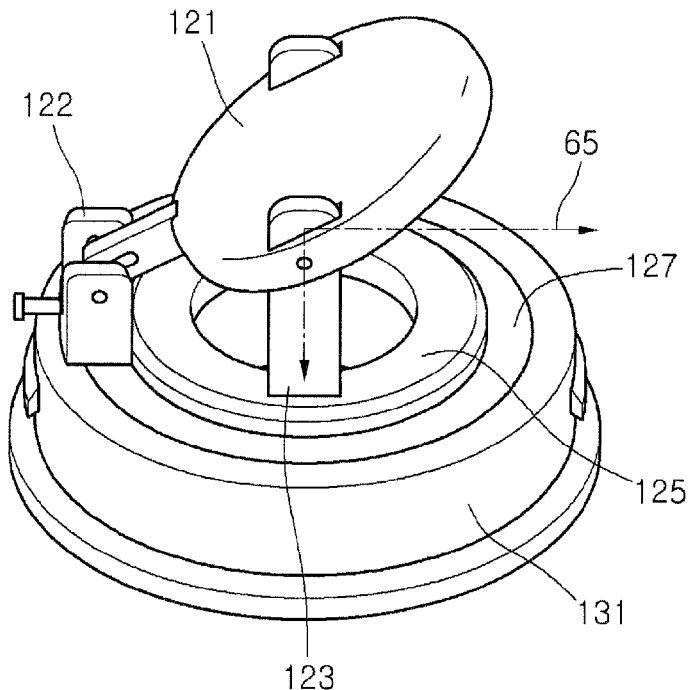
Figure 4B:
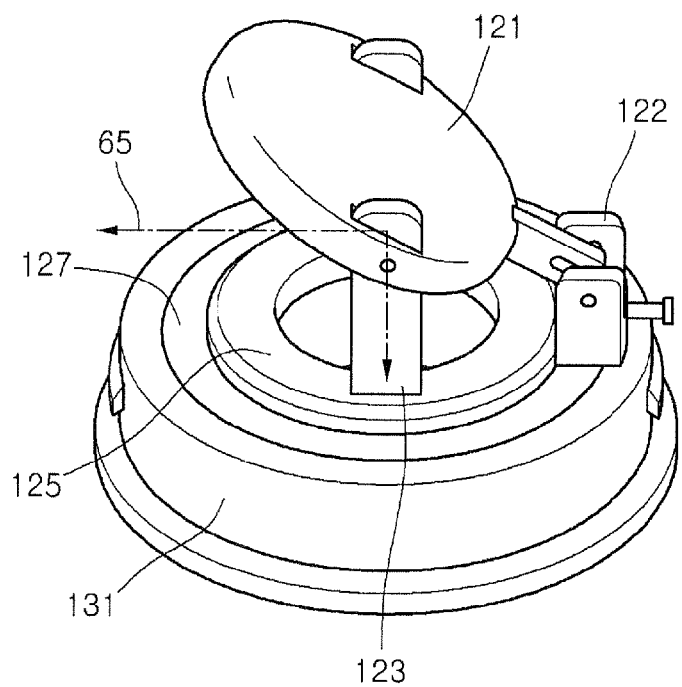

FIGS. 4A and 4B are schematic views illustrating that the reflective mirror rotates in the right side and the left side, respectively.

As shown in FIG. 4A, the light pulse 65 emitted from the light emitting unit 30 is reflected by the reflective mirror 121 and is emitted in the right direction, and the light pulse 65 incident from the right direction is reflected by the reflective mirror 121 and travels toward the light receiving unit 20.

When the reflective mirror 121 rotates by 180° in the first direction about the vertical axis as shown in FIG. 4B, the light pulse 65 emitted from the light emitting unit 30 is reflected by the reflective mirror 121 and is emitted in the left direction, and the light pulse 65 incident from the left direction is reflected by the reflective mirror 121 and travels toward the light receiving unit 20.

Accordingly, the position where the light pulse 65 is emitted is changed in the horizontal direction according to a rotational angle of the reflective mirror 121 in the first direction.

Figure 5:
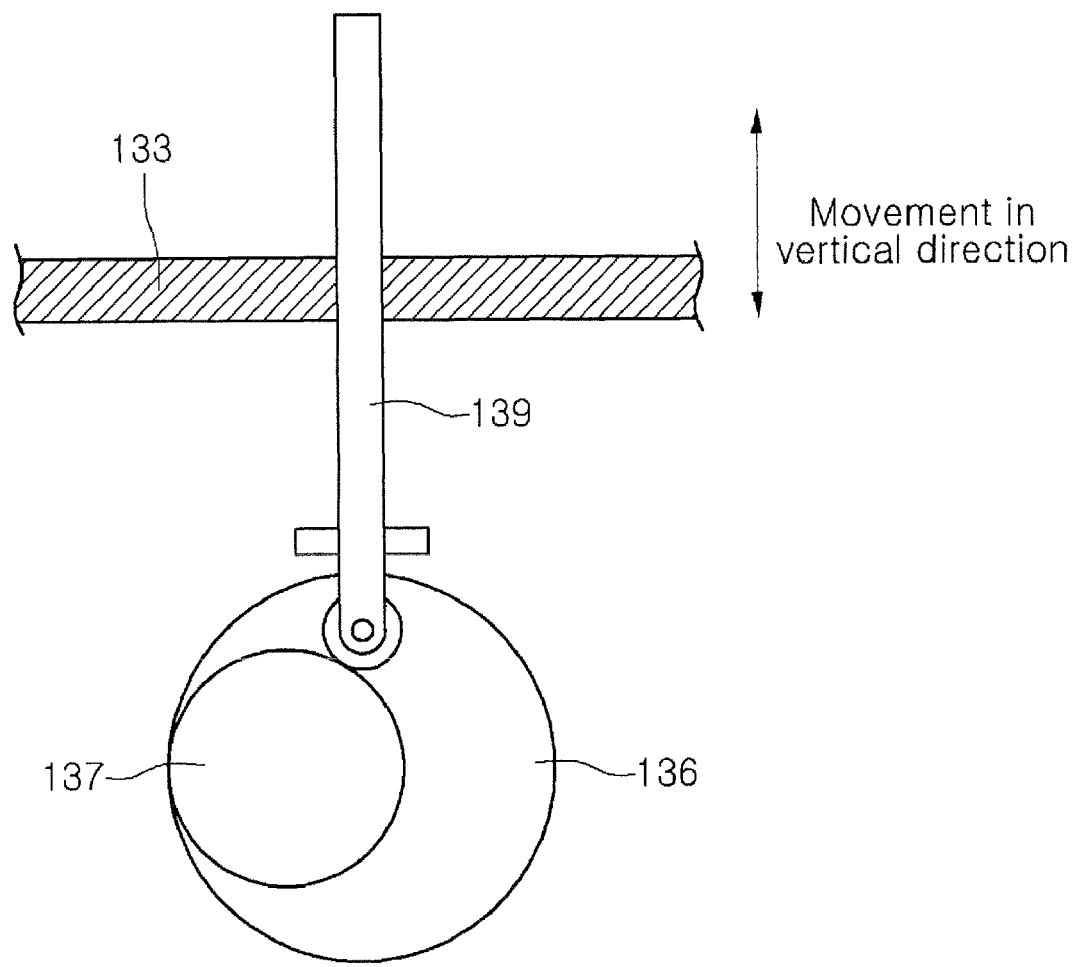
Figure 6:
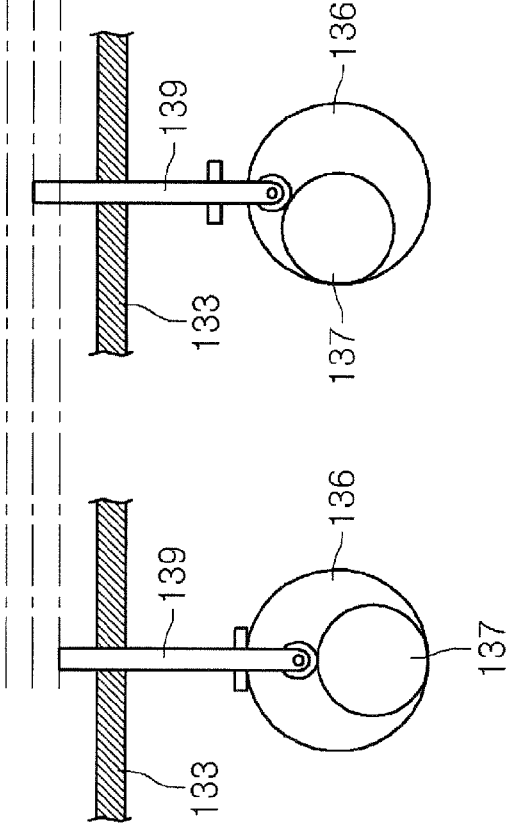
Figure 7:
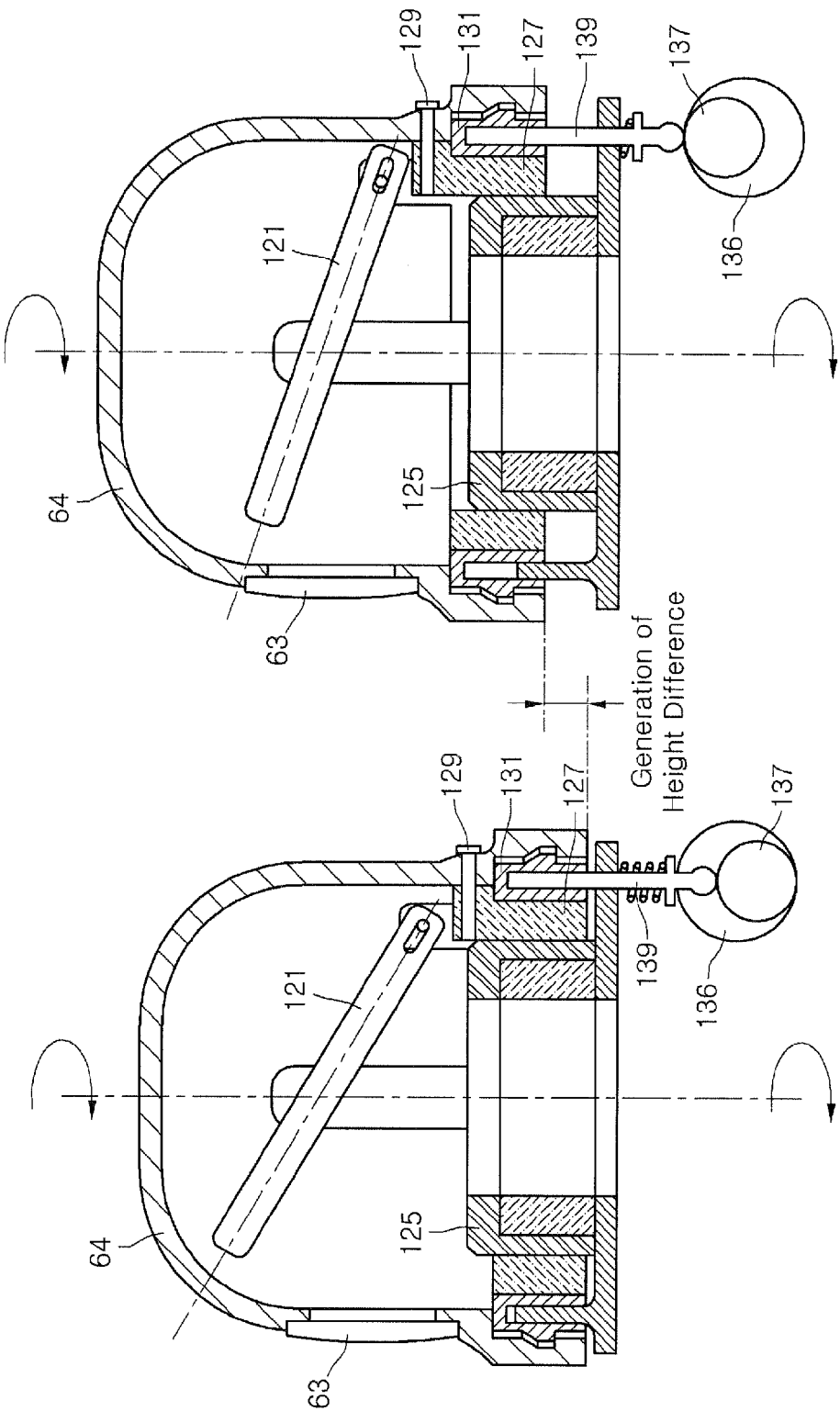

FIG. 5 is a schematic view illustrating that the cam driven shaft moves in the vertical direction.

The circular plate cam 137 is a cam having a point offset from a center of the circular plate as a rotational center, and as the circular plate cam motor 136 operates, the position of the circular plate cam 137 is changed to cause a change in height of the cam driven shaft 139.

FIGS. 6A, 6B and 6C show that when the position of the circular plate cam is changed, the height of the cam driven shaft is changed.

FIG. 6A shows that the cam driven shaft 139 is at the lowest point, FIG. 6C shows that the cam driven shaft 139 is at the highest point, and FIG. 6B shows that the earn driven shaft 139 is at a middle point.

That is, by a rotation of a cam assembly including the circular plate cam motor 136 and the circular plate cam 137, the cam driven shaft 139 can move in the vertical direction, so that the bearing 131 coupled to the cam driven shaft 139 moves in the vertical direction.

As the bearing 131 moves in the vertical direction, the bushing 127 moves in the vertical direction, and a slope of the reflective mirror 121 hinge-coupled with the bushing 127 is varied.

FIGS. 7A and 7B show that as the cam driven shaft moves in the vertical direction, the slope of the reflective mirror is varied and the lens and the lens supporter move in the vertical direction.

As the cam driven shaft 139 moves in the vertical direction, the bearing 131 moves in the vertical direction, and the lens supporter 64 coupled with the bearing 131 also moves in the vertical direction. The lens supporter 64 may be coupled with the bushing 127 by a fixing pin 129.

Meanwhile, when the cam driven shaft 139 moves in the vertical direction, the rotation motor 125 can operate. In this case, the reflective mirror 121 may rotate in the first direction and in the second direction at the same time.

That is, the circular plate cam motor 136 and the rotation motor 125 may operate at the same time or only one of the circular plate cam motor 136 and the rotation motor 125 may operate. Also, the circular plate cam motor 136 and the rotation motor 125 may operate at the same angular velocity or at different angular velocities.

Accordingly, the progressive direction of the light pulse 65 emitted from the light emitting unit 30 is changed according to operation states of the circular plate cam motor 136 and the rotation motor 125.

Figure 8:
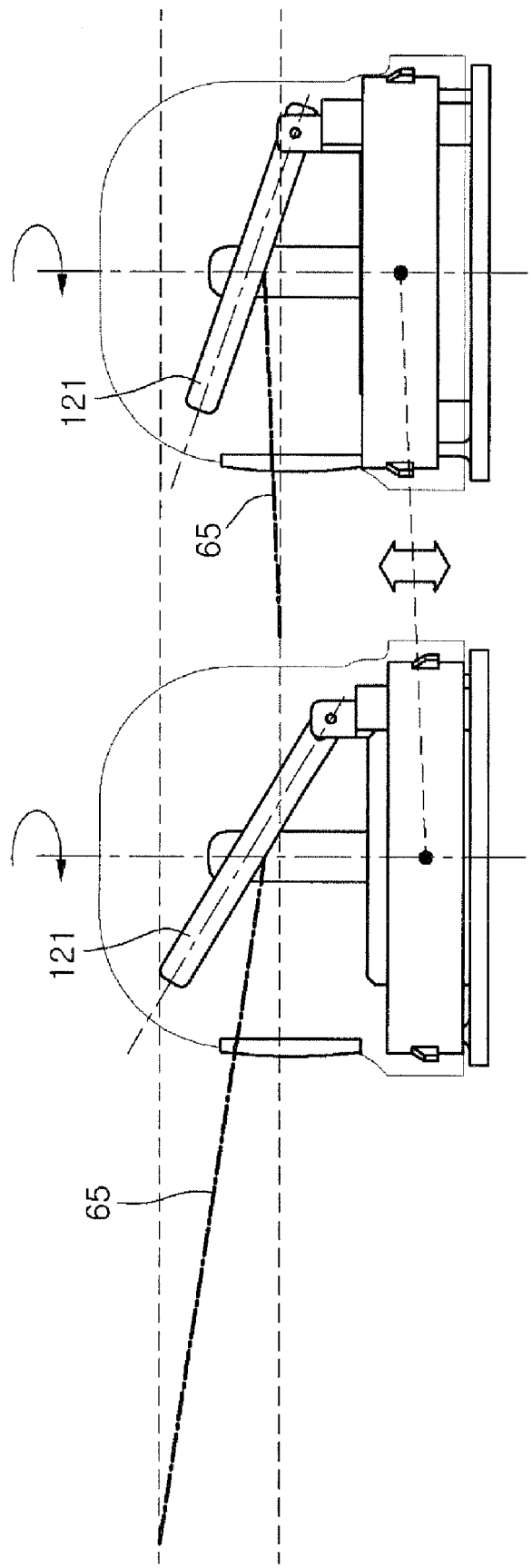

FIGS. 8A and 8B show that the progressive direction of the light pulse 65 is changed according to a variation in the slope of the reflective mirror 121.

That is, the light pulse 65 is emitted to various positions according to a rotation angle in the first and second directions, thereby making it possible to perform the range finding in a three-dimensional space.

FIGS. 9 to 12 are schematic views illustrating a range finder according to a second embodiment. A difference between the present embodiment and the first embodiment will be intensively described with reference to FIGS. 9 to 12.

Figure 9:
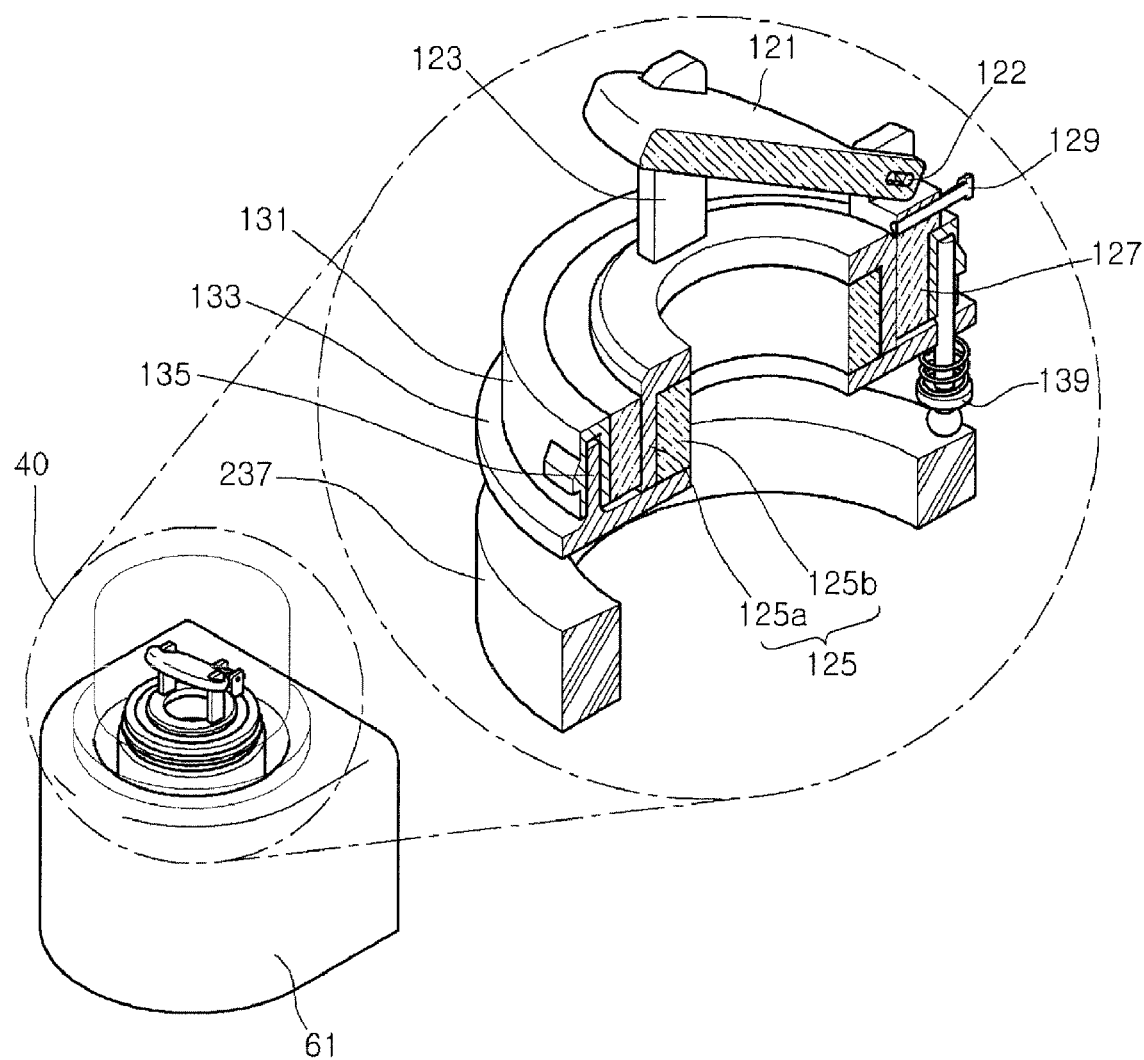
Figure 10:
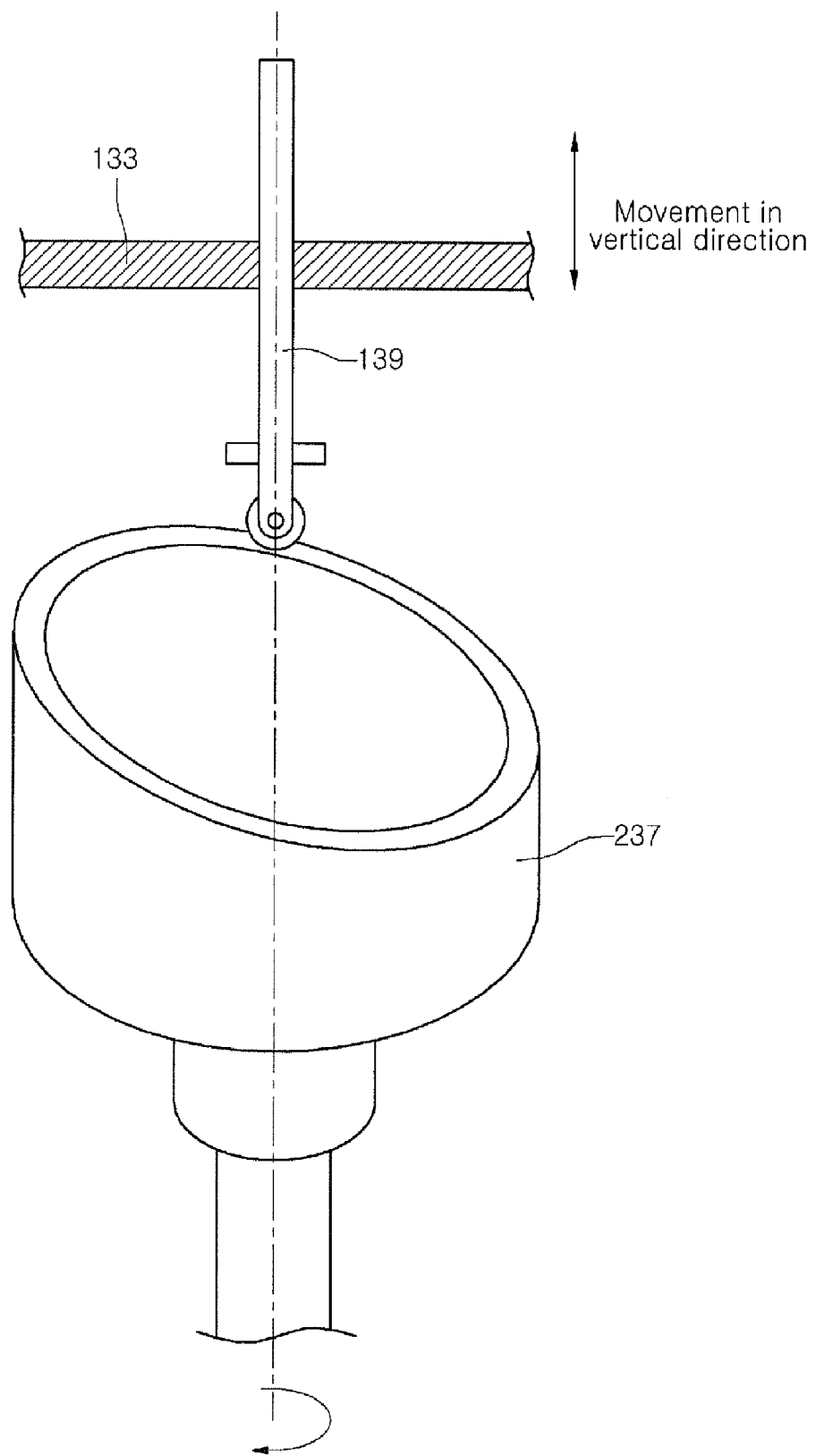
Figure 13:
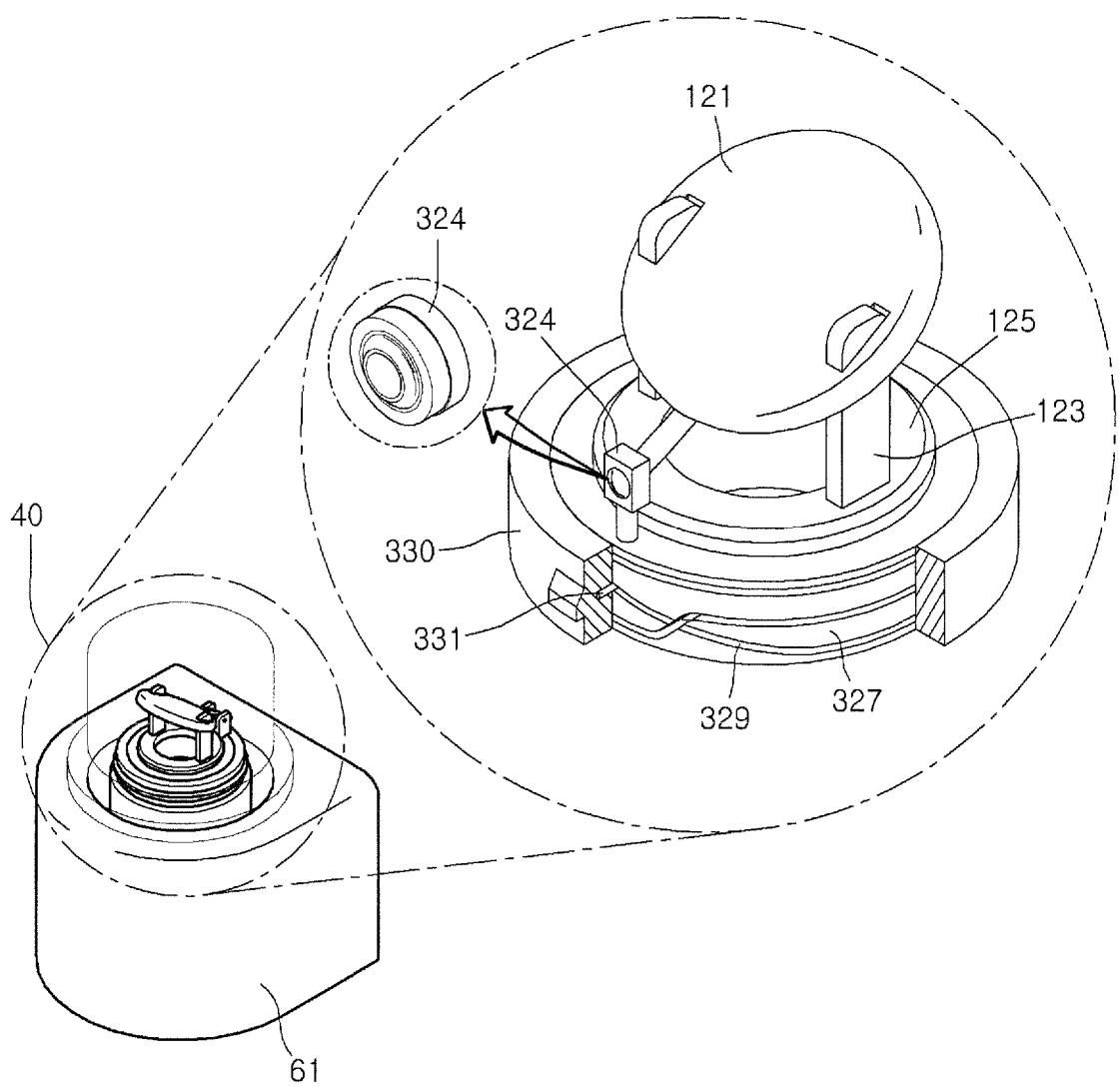

Referring to FIGS. 9 and 10, in the first embodiment, the cam assembly including the circular plate cam motor 136 and the circular plate cam 137 is installed in order to rotate the reflective mirror 121 in the second direction, i.e., to move the cam driven shaft 139 in the vertical direction.

However, in the second embodiment, an end cam 237 of which the top surface has different heights is installed.

Accordingly, as the end cam 237 rotates, a cam driven shaft 139 supported on the top surface of the end cam 237 moves along the top surface of the end cam 237 and moves in the vertical direction at the same time.

That is, as shown in FIGS. 11A, 11B and 11C, as the end cam 237 rotates, the cam driven shaft 139 supported on the top surface of the end cam 237 moves in the vertical direction.

Also, as shown in FIGS. 12A and 12B, as the cam driven shaft 139 moves in the vertical direction, the slope of the reflective mirror 121 is varied and the lens 63 and the lens supporter 64 move in the vertical direction.

Each of the range finders according to the first and second embodiments includes a rotation motor unit supporting the reflective mirror 121 to rotate in the second direction and rotating the reflective mirror 121 in the first direction, a bushing 127 hinge-coupled with the reflective mirror 121, rotating in the first direction together with the reflective mirror 121 and installed movably in the vertical direction, and a vertical driving unit moving the bushing 127 in the vertical direction.

In the first and second embodiments, the rotation motor unit is embodied by the rotation motor 125 and the reflective mirror supporting bar 123 coupled to the top surface of the rotation motor 125.

In the first embodiment, the vertical driving unit is embodied by the bearing 131, the cam driven shaft 139, the circular plate cam 137, and the circular plate cam motor 136, and in the second embodiment, the vertical driving unit is embodied by the bearing 131, the cam driven shaft 139 and the end cam 237.

FIGS. 13 to 16 are schematic views illustrating a range finder according to a third embodiment. A difference between the present embodiment and the first embodiment will be intensively described with reference to FIGS. 13 to 16.

In the first embodiment, the cam assembly including the circular plate cam motor 136 and the circular plate cam 137 is installed in order to rotate the reflective mirror 121 in the second direction, i.e., to move the cam driven shaft 139 in the vertical direction.

However, in the third embodiment, a solid cam is used in order to rotate the reflective mirror 121 in the second direction.

Referring to FIGS. 13, 14A, 14B and 14C, the actuator 40 includes a rotation motor 125, a reflective mirror supporting bar 123 installed on the rotation motor 125 and supporting the reflective mirror 121 to rotate about the horizontal axis, a solid cam 327 disposed outside the rotation motor 125, connected with the reflective mirror 121 by a spherical plane 324 and installed movably in the vertical direction, the solid cam 327 rotating in the first direction as the reflective mirror 121 rotates in the first direction about the vertical axis, and a bushing 330 disposed outside the solid cam 327 to guide the solid cam 327 to be moved in the vertical direction.

First, an operation that the reflective mirror 121 rotates in the first direction will be described. When the rotation motor 125 operates, the reflective mirror supporting bar 123 rotates and the reflective mirror 121 coupled to the reflective mirror supporting bar 123 rotates in the first direction.

At this time, one end of the reflective mirror 121 is coupled to the solid cam 327 through the spherical plane 324, and the solid cam 327 rotates together with the rotor of the rotation motor 125 outside the rotation motor 125.

Next, an operation that the reflective mirror 121 rotates in the second direction will be described. The solid cam 327 has a cam groove 329 formed on an outer circumference thereof, and a solid cam guide pin 331 moving along the cam groove 329 is formed on an inner circumference of the bushing 330.

When the reflective mirror 121 rotates in the first direction, the solid cam 327 coupled with the reflective mirror 121 through the spherical plane 324 rotates in the first direction, and the solid cam guide pin 331 formed on the inner circumference of the bushing 330 moves along the cam groove 329 formed on the outer circumference of the solid cam 327.

At this time, since the bushing 330 and the solid cam guide pin 331 are fixed, the solid cam 327 moves in the vertical direction along a pattern of the cam groove 329.

As the solid cam 327 moves in the vertical direction, the reflective mirror 121 coupled with the solid cam through the spherical plane 324 rotates in the second direction.

Since the reflective mirror 121 is coupled to the reflective mirror supporting bar 123 rotatably about the horizontal axis, the reflective mirror 121 can rotate freely in the second direction.

FIGS. 14A, 14B and 14C show that as the solid cam 327 rotates, the cam groove 329 of the solid cam 327 is guided into the solid cam guide pin 331 and thus the solid cam 327 moves in the vertical direction.

Also, as the solid cam 327 moves in the vertical direction, the reflective mirror 121 rotates in the second direction, so that the slope of the reflective mirror 121 is varied to 60°, 45° and 30°, respectively.

FIG. 14A shows that the solid cam 327 is at the lowest point, FIG. 14C shows that the solid cam 327 is at the highest point, and FIG. 14B shows that the solid cam 327 is at a middle point.

Figure 15A:
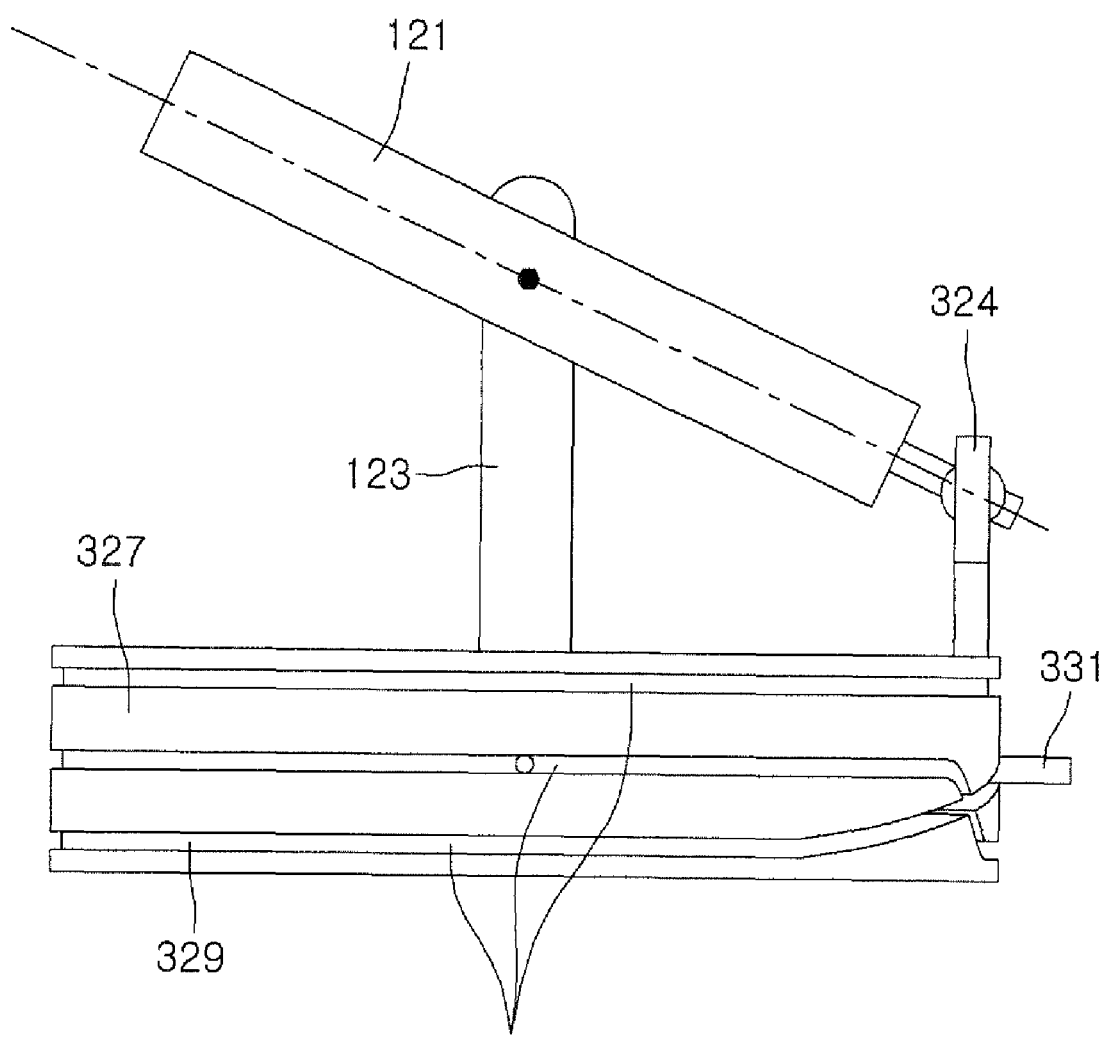
Figure 15B:
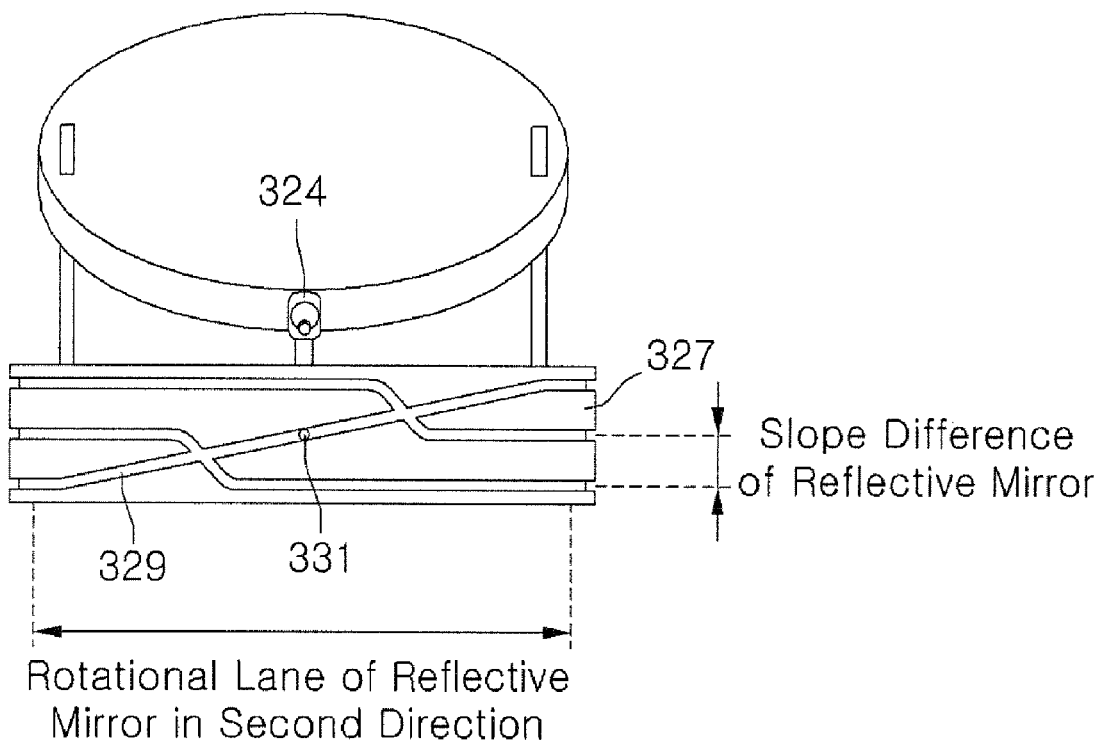

FIGS. 15A and 15B are schematic views illustrating the cam groove 329 formed on the outer circumference of the solid cam 327.

The cam groove 329 is formed in the pattern of a closed curve. The cam groove 329 extending in the horizontal direction as shown in FIG. 15A is a lane where the reflective mirror 121 does not rotate in the second direction but rotates in the first direction, and the cam groove 329 sloped upward as shown in FIG. 15B is a lane where the reflective mirror 121 rotates in the first and second directions at the same time.

In the lane where the reflective mirror 121 rotates only in the first direction, the cam grooves 329 are formed in parallel 137 to each other in the horizontal direction, and an interval between the cam grooves 329 represents a rotational angle of the reflective mirror 121 in the second direction, i.e., a slope difference of the reflective mirror 121.

The cam groove 329 includes at least two horizontal lanes extending in parallel to each other in the horizontal direction and spaced apart by a predetermined distance from each other, and a slope lane connecting the at least two lanes. As the solid cam guide pin 331 moves along the horizontal lanes and the slope lane, the reflective mirror 121 rotates in the first direction and the second direction.

FIGS. 16A, 16B, 16C and 16D are schematic views illustrating that when the solid cam 327 is guided by the solid cam guide pin 331 and moves in the vertical direction, the slope of the reflective mirror 121 is varied and thus a scanning track of the light pulse is varied.

Figure 16D:
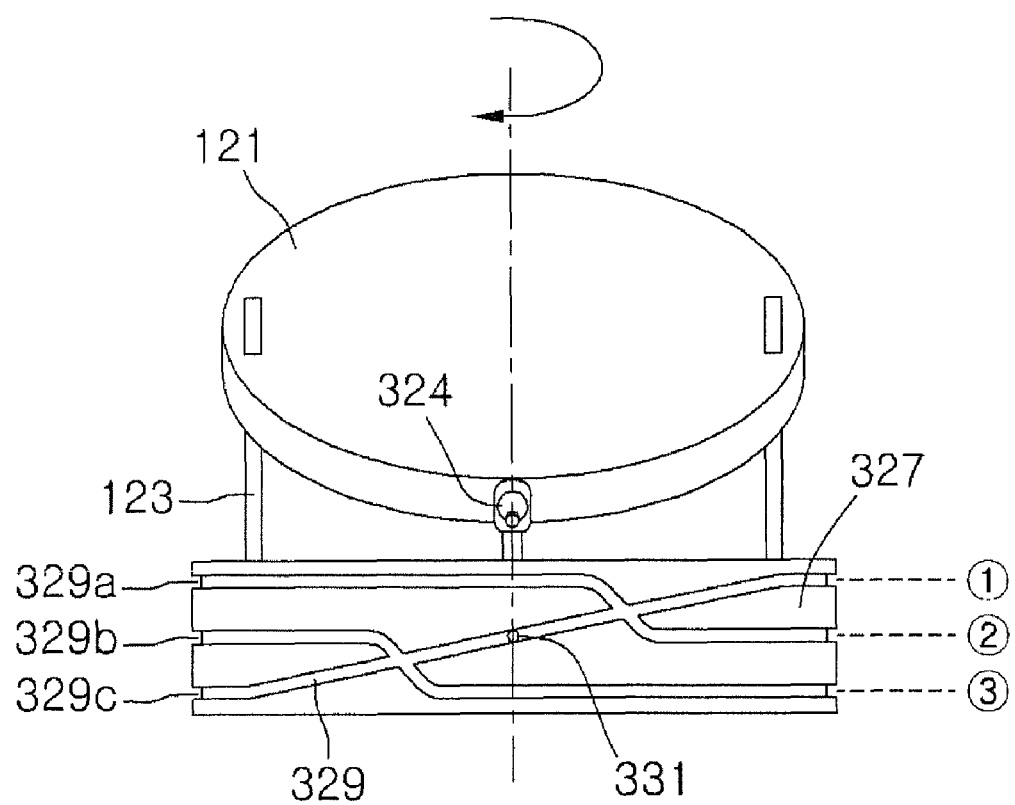

When the solid cam guide pin 331 is at a point ① of FIG. 16D, the solid cam 327 moves downward, so that the slope of the reflective mirror 121 with respect to the horizontal plane is increased and the light pulse is scanned upward as shown in FIG. 16A.

Meanwhile, when the solid cam guide pin 331 is at a point ③, the solid cam 327 moves upward, so that the slope of the reflective mirror 121 with respect to the horizontal plane is decreased and the light pulse is scanned downward.

The solid cam guide pin 331 moves from a third cam groove 329c of the point ③ to a first cam groove 329a of the point ① along the sloped cam groove 329 extending in the upward direction, moves from the first cam groove 329a of the point ① to a second cam groove 329b of a point ②, and again moves to the third cam groove 329c of the point ③.

Of course, when the rotational direction of the reflective mirror 121 in the first direction is changed to an opposite direction, the solid cam guide pin 331 moves from the third cam groove 329c of the point ③ to the second cam groove 329b of the point ②, moves from the second cam groove 329b of the point ② to the first cam groove 329a of the point ①, and again moves to the third cam groove 329c of the point ③.

In the above-described manner, the reflective mirror 121 can rotate in the first direction and the second direction.

As described above, the range finders according to the embodiments can scan a three-dimensional space using the light pulse emitted from the light emitting unit 30 by rotating the reflective mirror 121 in the first direction and the second direction.

In particular, in the range finders according to the embodiments, the actuator 40 can rotate the reflective mirror 121 in the first direction and the second direction by using the rotation motor 125 and various cam structures.

Since the actuator 40 provided in the embodiments is disposed in a space defined by the lower case 61 and the upper case, the range finders can be manufactured in a small size.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A range finder comprising:
  a light emitting unit emitting a light pulse;
  a light receiving unit sensing an incident light pulse;
  a reflective mirror reflecting the light pulse emitted from the light emitting unit to an outside space and reflecting the light pulse incident from the outside space to the light receiving unit;
  an actuator configured to move the reflective mirror in a first direction rotating about a vertical axis and a second direction rotating about a horizontal axis; and
  a controller controlling the light emitting unit and the light receiving unit and driving the actuator,
  wherein the actuator comprises:
  a rotation motor unit supporting the reflective mirror to be rotated in the second direction and rotating the reflective mirror in the first direction;
  a bushing hinge-coupled with the reflective mirror to rotate in the first direction together with the reflective mirror and installed movably in a vertical direction; and
  a vertical driving unit moving the bushing in the vertical direction,
  wherein the vertical driving unit comprises a bearing disposed outside the bushing and at least partially overlapping the bushing in the vertical direction, a cam driven shaft coupled with the bearing, and a cam assembly configured to move the cam driven shaft in the vertical direction.

2. The range finder of claim 1, wherein the rotation motor unit comprises a rotation motor including a rotor and a stator, and a reflective mirror supporting bar installed on the rotor to support the reflective mirror.

3. The range finder of claim 2, wherein the reflective mirror supporting bar supports the reflective mirror at two portions on a horizontal axis passing through a center of the reflective mirror.

4. The range finder of claim 1, wherein the bushing has a ring shape, and is disposed outside the rotation motor unit.

5. The range finder of claim 1, wherein the cam assembly comprises a circular plate cam motor, and a circular plate cam coupled with the circular plate cam motor and rotating about a central axis of a point offset from a center of a circular plate, and
  the cam driven shaft is supported on a circumference of the circular plate cam and moves in the vertical direction as a distance between the circumference of the circular plate cam and the central axis varies.

6. The range finder of claim 1, wherein the cam assembly comprises an end cam having a top surface of which the height varies, and the cam driven shaft is supported on the top surface of the end cam and moves in the vertical direction as the height of the top surface of the end cam varies.

7. The range finder of claim 1, wherein the bearing has a coupling groove opened downward, and the cam driven shaft is inserted into the coupling groove.

8. The range finder of claim 1, further comprising a supporting plate supporting the rotation motor unit, the bushing and the bearing.

9. The range finder of claim 8, wherein the supporting plate has a protruding portion, and is coupled with the bearing such that the bearing is movable in the vertical direction.

10. The range finder of claim 1, further comprising a lens supporter coupled with the bearing to enclose the reflective mirror, and a lens supported by the lens supporter and disposed on a path of the light pulse.

11. The range finder of claim 1, further comprising a lower cover supporting the light emitting unit, the light receiving unit, the reflective mirror and the actuator, and an upper cover coupled with the lower cover to define an inner space.

12. The range finder of claim 11, wherein the controller is disposed in the inner space defined by the lower cover and the upper cover.

13. A range finder comprising:
  a light emitting unit emitting a light pulse;
  a light receiving unit sensing an incident light pulse;
  a reflective mirror reflecting the light pulse emitted from the light emitting unit to an outside space and reflecting the light pulse incident from the outside space to the light receiving unit;
  an actuator configured to move the reflective mirror in a first direction rotating about a vertical axis and a second direction rotating about a horizontal axis; and
  a controller controlling the light emitting unit and the light receiving unit and driving the actuator,
  wherein the actuator comprises:
  a rotation motor unit supporting the reflective mirror to be rotated in the second direction and rotating the reflective mirror in the first direction;
  a solid cam coupled with the reflective mirror to rotate in the first direction together with the reflective mirror and installed movably in a vertical direction; and
  a bushing guiding the solid cam in the vertical direction,
  wherein the solid cam has a cam groove formed on an outer circumference, a solid cam guide pin moving along the cam groove is installed on an inner circumference of the bushing, and as the solid cam rotates, the solid cam moves in the vertical direction by the solid cam guide pin.

14. The range finder of claim 13, wherein the reflective mirror is coupled with the solid cam through a spherical plane.

15. The range finder of claim 13, wherein the cam groove comprises at least two horizontal lanes extending in parallel to each other in a horizontal direction and spaced apart by a predetermined distance from each other, and a slope lane connecting the at least two horizontal lanes.

16. The range finder of claim 13, wherein the rotation motor unit comprises a rotation motor including a rotor and a stator, and a reflective mirror supporting bar installed on the rotor to support the reflective mirror.

17. The range finder of claim 16, wherein the reflective mirror supporting bar supports the reflective mirror at two portions on a horizontal axis passing through a center of the reflective mirror.

18. The range finder of claim 13, wherein the solid cam has a ring shape and is disposed outside the rotation motor unit.

* * * * *